(12) United States Patent
Postec et al.

(10) Patent No.: US 11,821,333 B2
(45) Date of Patent: Nov. 21, 2023

(54) BLOWER VANE

(71) Applicant: Safran Aircraft Engines, Paris (FR)

(72) Inventors: Clément Pierre Postec, Moissy-Cramayel (FR); Vivien Mickaël Courtier, Moissy-Cramayel (FR); Vincent Joudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 22 days.

(21) Appl. No.: 17/625,195

(22) PCT Filed: Jul. 9, 2020

(86) PCT No.: PCT/FR2020/051236
§ 371 (c)(1),
(2) Date: Jan. 6, 2022

(87) PCT Pub. No.: WO2021/005312
PCT Pub. Date: Jan. 14, 2021

(65) Prior Publication Data
US 2022/0268159 A1    Aug. 25, 2022

(30) Foreign Application Priority Data

Jul. 11, 2019   (FR) .................................... 1907809

(51) Int. Cl.
*F01D 5/14* (2006.01)
*F01D 5/28* (2006.01)
*B29D 99/00* (2010.01)

(52) U.S. Cl.
CPC ............... *F01D 5/14* (2013.01); *F01D 5/282* (2013.01); *B29D 99/0025* (2013.01); *F05D 2220/36* (2013.01); *F05D 2230/50* (2013.01)

(58) Field of Classification Search
CPC ........ F01D 5/14; F01D 5/282; B29D 99/0025
See application file for complete search history.

(56) References Cited

U.S. PATENT DOCUMENTS 5,672,417 A    9/1997  Champenois et al.
9,080,454 B2 *  7/2015  Coupe ............... C04B 35/62873
(Continued)

FOREIGN PATENT DOCUMENTS

| EP | 1 908 919 A1 | 4/2008 |
| EP | 3 406 424 A1 | 11/2018 |
| FR | 2 732 406 A1 | 10/1996 |

OTHER PUBLICATIONS

French Search Report for corresponding French Application No. 1907809, dated Feb. 12, 2020.
(Continued)

*Primary Examiner* — Michael L Sehn
(74) *Attorney, Agent, or Firm* — Birch, Stewart, Kolasch & Birch, LLP

(57) ABSTRACT

The present invention relates to a blower vane of a turbomachine, comprising a structure made of composite material which comprises a fibrous reinforcement and a matrix in which the fibrous reinforcement is embedded. The vane comprises a first rigidification insert which extends in a first direction and at least one second insert which is connected to the first in a second direction which is non-collinear with the first direction, the first insert projecting from the vane in order to be connected to a disc of a turbomachine element.

12 Claims, 4 Drawing Sheets

(56) References Cited

U.S. PATENT DOCUMENTS

2008/0075601 A1 3/2008 Giusti et al.
2014/0112796 A1 4/2014 Kray et al.
2014/0161620 A1 6/2014 Kray et al.

OTHER PUBLICATIONS

International Search Report for International Application No. PCT/FR2020/051236, dated Oct. 20, 2020.

\* cited by examiner

BLOWER VANE

FIELD OF THE INVENTION

The present invention relates to the field of blades and particularly to the field of blades intended for turbomachines, in particular aeronautical type turbomachines.

STATE OF THE ART

A turbomachine conventionally comprises a compressor, a combustion chamber and a turbine constituting a gas generator for generating power. The role of the compressor is to increase the air pressure provided to the combustion chamber. The role of the turbine is to drive in rotation the compressor by taking part of the pressure energy from the hot gases leaving the combustion chamber and by transforming it into mechanical energy.

A turbomachine can be of the "double-flow" type, that is to say traversed by two air flows; a primary flow and a secondary flow. The primary flow is produced by constituent elements of a single-flow turbomachine to which one or several additional turbines are added to drive a compression blading, the fan. The latter is equipped with large-dimensioned blades, the fan blades producing the secondary flow. The fan slightly increases the pressure of the gases passing therethrough, but since its diameter is large, the energy produced for the thrust is high. A flow straightener cascade is positioned behind the fan to straighten the air flow coming from the fan.

The current trend in civil aircraft engines aims to reduce the specific fuel consumption, noise pollution and nitrogen oxide (Nox) emissions. One of the technical solutions adopted by the engine manufacturers consists in increasing the by-pass ratio between the primary flow and the secondary flow. As such, several architectures such as UHBR (Ultra High Bypass Ratio) engines and unducted doublet-propeller (CROR: Counter Rotating Open-Rotor or USF: Unducted Single Fan) engines are envisaged as a potential replacement for current turbomachines for medium-haul flights.

More particularly, the USF architectures consist of a traction generator: a propeller similar to a fan followed by an unducted straightener cascade, and of a power generator which allows driving the traction generator.

Furthermore, it is known to use turbomachine blades made of composite material based on reinforcing fibers impregnated with an organic matrix.

These composite material blades are appreciated for their lightness compared to the metal blades and for their strength. In addition, these blades are usually made from glass, carbon, Kevlar fibers, etc. associated with a high-strength thermosetting resin matrix. Such materials have good strength in the fiber direction, but some configurations of said fibers may have drawbacks such as limitations in the mechanical strength resulting for example in strength limits in order to avoid delamination. Consequently, some configurations are adapted to a particular type of turbomachine family and difficult to adapt to other types of turbomachine, for example depending on the desired amount of thrust or more generally on the performance of the turbomachine. The same applies for the stiffness when fibers with a high modulus of elasticity such as carbon are used. The fibers are disposed in bundles and/or webs of superimposed fabrics disposed in shells or draped around a core.

The superimposed fabric webs authorize good strength in the plane of the fabric webs, especially in the directions of the weft and warp yarns composing them. Delamination refers to the decohesion of the composite material between the fabric webs, for example under the effect of a strong shock which would be caused by an ingestion of a large bird.

Furthermore, and in order to improve the resistance of the blade to the impacts of foreign bodies, the fabric webs are usually disposed without cuts along the surface of the blade; the arrival of the end of a fabric web at the surface of the blade could result in a weakness in the delamination at this location. This technology can be difficult to develop in the case of fan blades of turbine engines for aircrafts, especially when it comes to blades called "wide chord" blades, that is to say having a large distance between the leading edge and the trailing edge. Such blades can reach a height of 1,200 mm and a distance between the leading edge and the trailing edge of 500 mm while remaining thin and light. They are more particularly exposed to the impacts of foreign bodies, such as birds, which are ingested by the turbine engine. Among the various stresses undergone by these blades, two of them require contradictory technical solutions:

1) the blade vibrates according to different eigenmodes, in particular flexural and torsional modes. To overcome this, it is necessary to increase the stiffness of the blade and to place in the mass of the blade high densities of fibers made of a material with a high modulus of elasticity.
2) the blade can be subjected to the impacts of foreign bodies which can cause the breaking of the matrix between the fabric webs causing the decohesion of these webs relative to each other. This breaking called "delamination" begins at the point of impact and then propagates between the different fabric webs concerned. The problem is that the delamination is promoted by the necessary stiffness of the blade which prevents the absorption of the shocks of the impacts.

Fabrics are known including several layers linked together directly to the weaving by additional yarns passing therethrough and woven with weft and warp yarns of each layer. These fabrics are therefore called 3D fabrics, D meaning dimension. The additional yarns provide great resistance to delamination inside the fabric, but they make this same fabric heavier.

A multilayer fabric whose warp yarns each pass through several layers is also known from patent FR 2 610 951, this fabric making it possible to produce thin structures, in particular for thermal protection elements of spacecrafts. These fabrics offer for equal mass a better strength than the 3D fabrics above, but they do not solve the problem of delamination between the fabric webs then assembled in successive layers to constitute the blade.

In addition, it is known from document FR2732406 to use an insert for stiffening a blade made of 3D fabrics. However, these inserts are well adapted to some applications. However, improvements are sought, particularly to adapt the blade to an application in a variable-pitch stator stage. In this type of application, the constraints are specific, particularly for the fastening connection of the blade in the turbomachine, for example to offer sufficient stiffness for a blade of a stator stage while ensuring pitch modifications in the case of a variable-pitch stator stage.

Accordingly, it would be desirable to have a blade with sufficient stiffness to be attached to a variable-pitch stator stage and ensuring pitch modifications.

In the present description, a stage corresponds to a bladed wheel that can also be qualified as blading.

DISCLOSURE OF THE INVENTION

According to a first aspect, the invention proposes a fan blade of a turbomachine comprising a composite material structure comprising a fibrous reinforcement and a matrix in which the fibrous reinforcement is embedded. The fan blade comprises a first stiffening insert extending along a first direction and at least a second insert connected to the first one along a second direction not collinear with the first direction, said first insert emerging from the blade to be connected to a disk of a turbomachine element.

Thus, in a particularly advantageous manner, the two inserts connected to each other allow the blade to have sufficient stiffness to be attached to a variable-pitch stator stage and ensure pitch modifications.

The first insert, called radial insert, can extend along a radial direction of the blade.

The second insert, called axial insert, can extend along an axial direction of the blade.

The inserts can be assembled to each other to form a cross.

The radial insert may have a through-hole adapted to be traversed by the axial insert.

The fibrous reinforcement can be obtained by three-dimensional weaving of strands.

The fibrous reinforcement can have a radial unbinding from a base of the blade and up to approximately 60% of a height of the blade, and between 20% and 30% of a chord at the vane root of the blade.

The fibrous reinforcement can have an axial unbinding located between 20% and 60% of a height of the blade from a base of the blade, and emerging on a leading edge or a trailing edge of the blade.

According to another aspect, the invention proposes a method for manufacturing a fan blade according to the invention, comprising the steps of:
  providing the fibrous reinforcement,
  positioning and assembling the inserts in the fibrous reinforcement,
  injecting resin on the fibrous reinforcement.

The positioning of the inserts can be achieved by the unbindings.

According to another aspect, the invention proposes a turbomachine comprising a blade according to the invention.

The turbomachine may comprise an upstream rotor stage and a downstream variable-pitch stator stage, relative to a flowing direction of the gases, the variable-pitch stator stage being able to comprise at least one blade.

According to another aspect, the invention proposes an aircraft comprising at least one turbomachine according to the invention.

DESCRIPTION OF THE FIGURES

Other characteristics, aims and advantages of the invention will emerge from the following description, which is purely illustrative and not limiting, and which should be read in relation to the appended drawings in which.

In all of the figures, similar elements bear identical references.

DETAILED DESCRIPTION OF THE INVENTION

Figure 1:
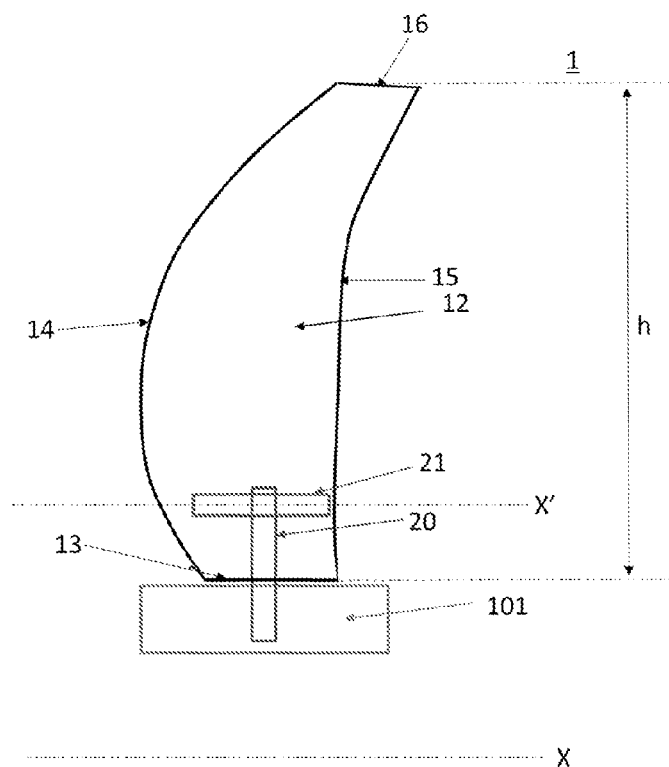
FIG. 1 is a schematic sectional representation of a blade according to the invention.

In the present application, the upstream and the downstream are defined relative to the normal flowing direction of the gas in the turbomachine 10, particularly in a variable-pitch stator stage 100 comprising a blade 1. Furthermore, the axis of revolution of the variable-pitch stator stage 100 refers to the axis X of radial symmetry of the variable-pitch stator stage 100, this axis X corresponding to the overall axis of revolution of the turbomachine, particularly the axis of rotation of its rotors. According to the embodiment presented here, the blade 1 is fixed to a variable-pitch stator stage 100. However, according to other embodiments, the blade 1 could be fixed to any type of fan without inducing significant structural modifications.

The axial direction X corresponds to a direction located in a plane substantially parallel to the direction of the axis X of the variable-pitch stator stage 100 and connecting a leading edge and a trailing edge of the blade 1, and a radial direction Z is a direction perpendicular to this axis X and passing therethrough. These two directions are defined in an orthogonal reference frame also integrating an azimuthal direction (not represented). For convenience, in the present description, the case in which the vector X is oriented in the direction of the turbomachine will be considered. Nevertheless, it is understood that the stator stage 100 of the presented turbomachine 10 being a variable-pitch stator stage, the orientation of the vector X' may vary depending on the orientation of the blades of this stage but in order to facilitate the explanations in the description, the direction of the vector is considered while remaining in a plane substantially parallel to the axis X. Likewise, a vector Z corresponding to the direction Z is oriented from the center of the turbomachine to the outside.

A variable-pitch stator stage 100 comprises a disk carrying a plurality of blades 1 associated with a fixing device 101 associated with a variable-pitch system 102. Here, the notion of disk corresponds in general definition to any device for fixing the blade in the turbomachine, in a general section of the blade base.

Blade

Each blade 1 comprises a structure made of composite material including a fibrous reinforcement 11 obtained by three-dimensional weaving and a matrix in which the fibrous reinforcement 11 is embedded.

This composite material structure forms an airfoil vane 12.

The vane 12 has, in a manner known per se, a base 13, a top 16, a leading edge 14 and a trailing edge 15, an intrados wall and an extrados wall. The base 13 corresponds here to a radially internal end section of the vane opposite its top which is its radially external end.

The leading edge 14 is configured to extend facing the flowing of gases entering the turbomachine. It corresponds to the anterior portion of an airfoil which faces the air flow and which divides the air flowing into an intrados flowing and an extrados flowing. The trailing edge 15 for its part corresponds to the posterior portion of the airfoil, where the intrados flowing and extrados flowing meet.

Finally, the structure is formed of a plurality of sections of the blade 1 stacked from the base 13 along a stacking axis corresponding to the radial direction Z extending radially relative to the axis of revolution X of the fan.

In the following, "height" will refer to a distance along the radial direction Z.

Thus, the vane 12 has a height h corresponding to the distance along the radial direction Z between its base 13 and its top 16.

Fibrous Reinforcement

The fibrous reinforcement 11 can be formed from a fibrous preform in a single piece obtained by three-dimensional or multilayer weaving with varying thickness. It comprises warp and weft strands which may in particular comprise carbon, glass, basalt and/or aramid fibers. The matrix for its part is typically a polymer matrix, for example epoxy, bismaleimide or polyimide. The blade 1 is then formed by molding by means of a vacuum resin injection process of the RTM (Resin Transfer Molding) or VARRTM (Vacuum Resin Transfer Molding) type.

In the example shown here, the weft strands 111 extend along the axial direction X and the warp strands 112 extend along the radial direction Z.

According to a particular technical arrangement, the fibrous reinforcement 11 has unbindings 113 and 114.

Preferably, the fibrous reinforcement 11 has a radial unbinding 113 from the base 13 of the blade 1 and up to about 60% of the height h of the blade 1, and between 20% and 30% of a chord in the base of the vane of the blade 1 extending from the leading edge 14 of the vane to the trailing edge 15. The radial unbinding 113 means that the warp strands 112 are no longer connected over the entire thickness of the fibrous reinforcement 11 between two columns of fixed warp strands 112.

In addition, the fibrous reinforcement 11 has an axial unbinding 114 located between 20% and 60% of the height of the blade 1 from the base 13 of the vane of the blade 1, and emerging over an entire chord of the blade 1 extending from the leading edge 14 to the trailing edge 15. The axial unbinding 114 means that the warp strands 112 are no longer connected over the entire thickness of the fibrous reinforcement 11 between two columns of fixed weft strands 111.

The unbindings 113 and 114 are particularly advantageous technical arrangements of the invention, the function of which will be detailed below.

Inserts

According to a particularly advantageous arrangement, the blade 1 comprises two stiffening inserts 20, 21. A first insert 20 extends along a first direction and a second insert 21 extends along a second direction, not collinear with the first direction.

In other words, the two inserts 20 and 21 are oriented along two intersecting directions.

As will be detailed below, this arrangement allows stiffening the blade 1 in particular by allowing the inserts 20 and 21 to be mutually blocked in rotation. As will be detailed below, the inserts are embedded in the composite material structure. Thus, a torque transmitted on an insert is passed on to the other insert and transmitted to the whole composite material structure. The orientation of the two inserts increases the moment resulting from the torque transmitted to an insert. Thus, in the case where the transmitted torque is intended to pivot the blade 1, the arrangement of the two inserts 20 and 21 allows effectively modifying the orientation of the blade 1. Likewise, in the opposite case where the blade 1 must withstand the transmitted torque, the arrangement of the inserts 20 and 21 allows having a large resistive torque for keeping the blade 1 in the desired position.

According to the embodiment presented here, the first insert, called radial insert 20 extends along the radial direction Z, and the second insert, called axial insert 21 extends along the axial direction X.

Figure 2:
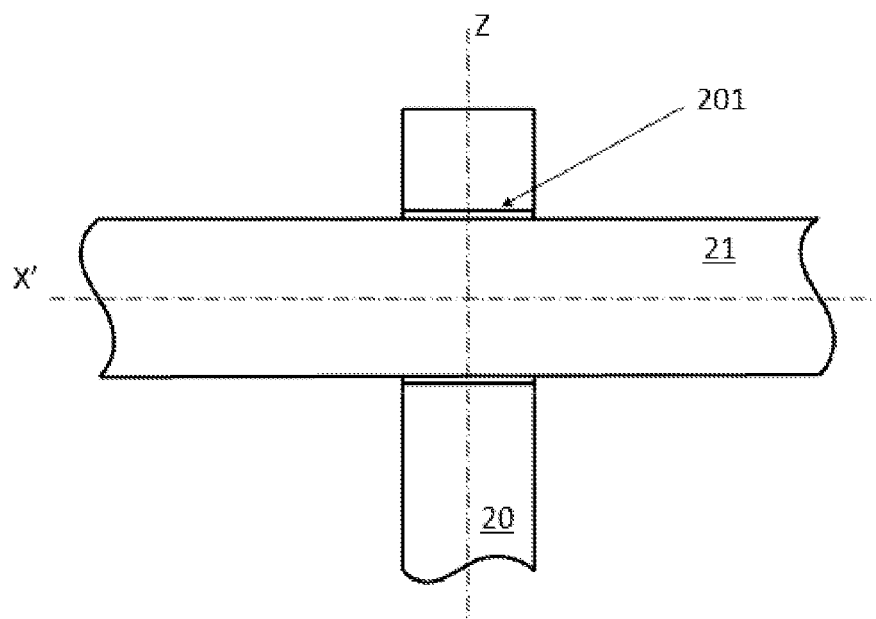
FIG. 2 is a schematic representation of the assembly of two inserts according to the invention in an axial plane.
Figure 3:
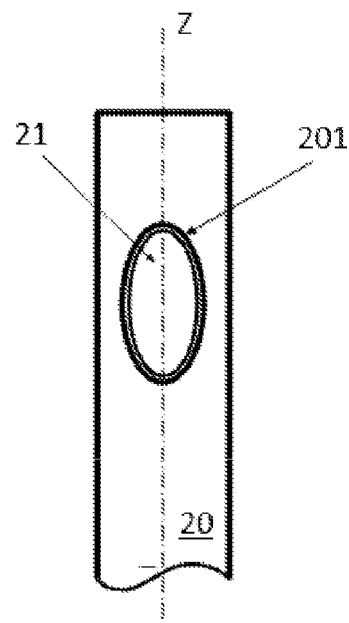
FIG. 3 is a schematic representation of the assembly of two inserts according to the invention in a radial plane.
Figure 4:
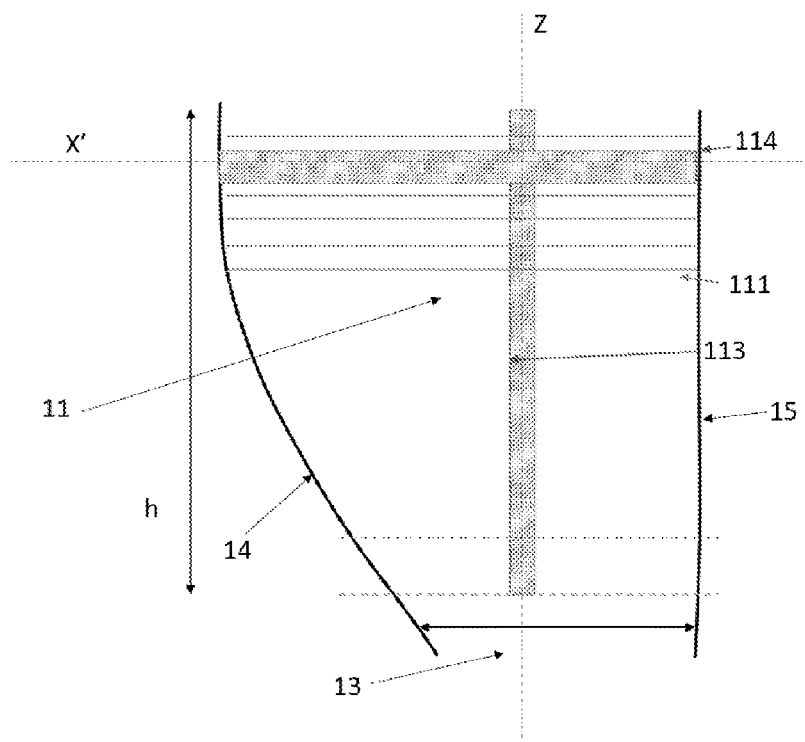
FIG. 4 is a schematic representation of an unbinding in an axial plane.
Figure 5:
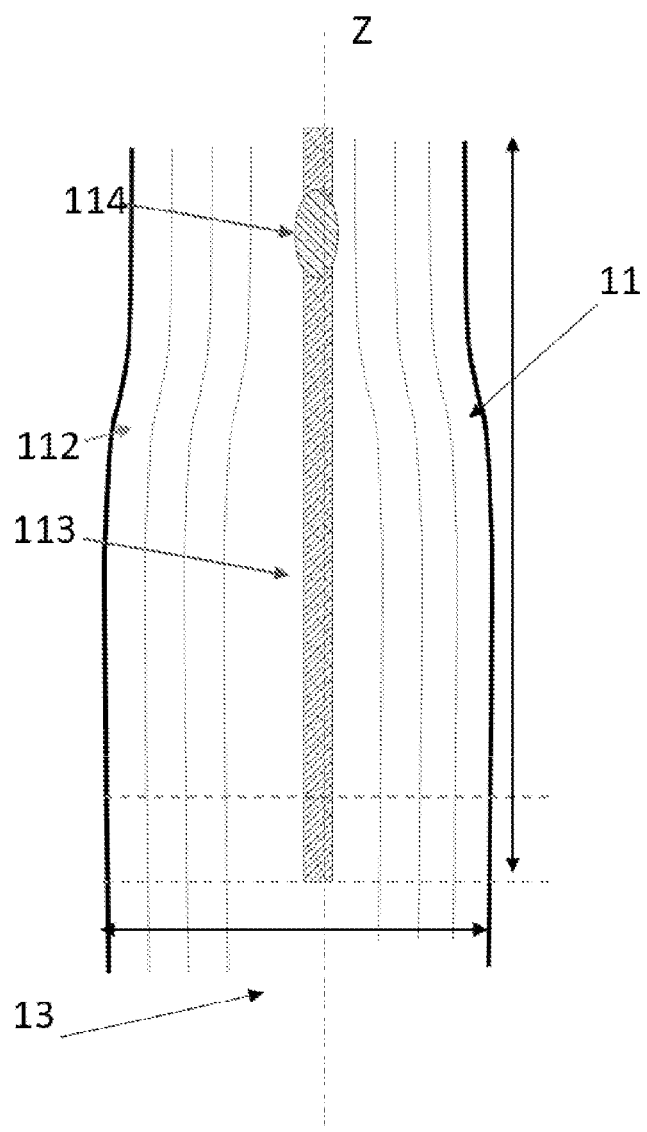
FIG. 5 is a schematic representation of an unbinding in a radial plane.

As represented in FIGS. 2 and 3, the two inserts 20 and 21 may each have the shape of a rod of substantially elliptical cross-section. In addition, the inserts 20 and 21 are preferably assembled in a cross. According to this arrangement, the radial insert 20 has an axial through-hole 201 adapted to be traversed by the axial insert 21.

According to the embodiment shown here, the inserts are embedded one inside the other.

In a particularly advantageous manner, the elliptical section of the inserts 20 and 21 allows the inserts 20, 21 to be easily blocked in rotation by placing them in a hole or a complementary elliptical cavity. As will be described below, this arrangement allows easily transmitting a torque to the radial insert 20.

As represented in the figures, the radial insert 20 emerges from the base 13 of the vane. This arrangement allows using the radial insert 20 to assemble the blade 1 to a variable-pitch system 101. The variable-pitch system 101 is adapted to transfer a torque to the radial insert 20 in order to pivot the blade 1 around the radial direction Z.

It is easily understood that the cross structure of the two inserts 20 and 21 allows stiffening the blade 1 and in particular increasing the rotational force stiffness around the radial direction Z.

Typically, the inserts 20 and 21 are metal rods.

Manufacturing Method

According to another aspect, the invention relates to a method for manufacturing a blade 1.

The manufacturing method mainly comprises the steps of:
providing the fibrous reinforcement 11,
positioning and assembling the inserts 20, 21 in the fibrous reinforcement 11,
injecting resin on the fibrous reinforcement 11 namely by impregnating the fibrous reinforcement and wrapping the fibrous reinforcement.

More specifically, the supply of the fibrous reinforcement 11 comprises a step of weaving the weft 111 and warp 112 strands of the fibrous reinforcement 11. Preferably, the fibrous reinforcement 11 is woven along a direction extending from the base 13 to the top 16.

The positioning and the assembly of the inserts 20, 21 in the fibrous reinforcement 11 are achieved by means of the unbindings 113 and 114. Preferably, the radial insert 20 is inserted by the base 13. The axial insert 21 is then inserted by the leading edge 14 or the trailing edge 15 and passes through the hole 201 of the radial insert 20.

A co-injection can then be carried out using the RTM process. It is remarkable that the inserts 20 and 21 are present in the preform at the time of the injection. This arrangement allows the inserts 20 and 21 to be embedded in the resin and thus form an integral part of the composite.

It is specified that in the case where the inserts are made of metal, the characteristics of the metal chosen allow them to withstand the high temperature of the mold during the injection.

According to one advantageous arrangement, the injection mold must take into account a specific spacing for the radial insert 20 which will protrude from the vane 12 in order to avoid any presence of resin around it.

It is possible to provide for a deburring at the end of the injection step.

During the injection, several solutions can be envisaged in order to simplify the machining/surface treatment operations thereafter:

The first solution is to machine a rough over-length of the vane 12 and of the radial insert 20 at the same time. In this case, it will potentially be necessary to provide an over-thickness on the radial insert 20 which will be machined and will allow having a clean surface condition thereof.

Figure 6:
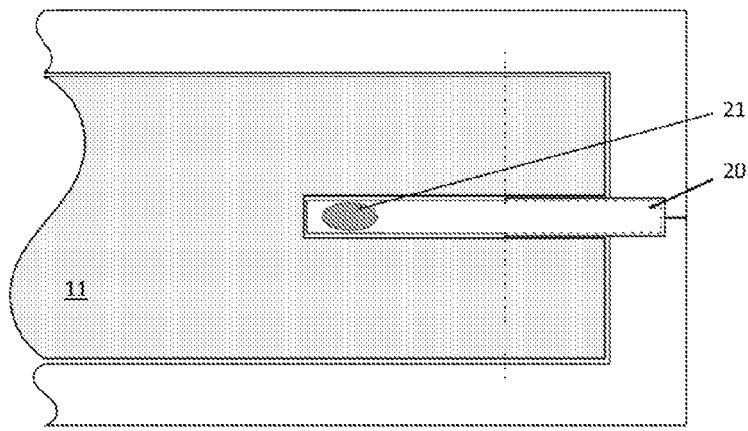
FIG. 6 is a schematic representation of a resin injection step on a fibrous reinforcement according to the invention.

A second solution is to cover the portion of the radial insert 20 located roughly during the injection. In this case, the surface of the radial insert located roughly must have a clean surface condition during its assembly because it will not be reworked after injection. This part could be fixed on the mold or simply be an addition to be fitted onto the radial insert 20 (see FIG. 6).

Figure 7:
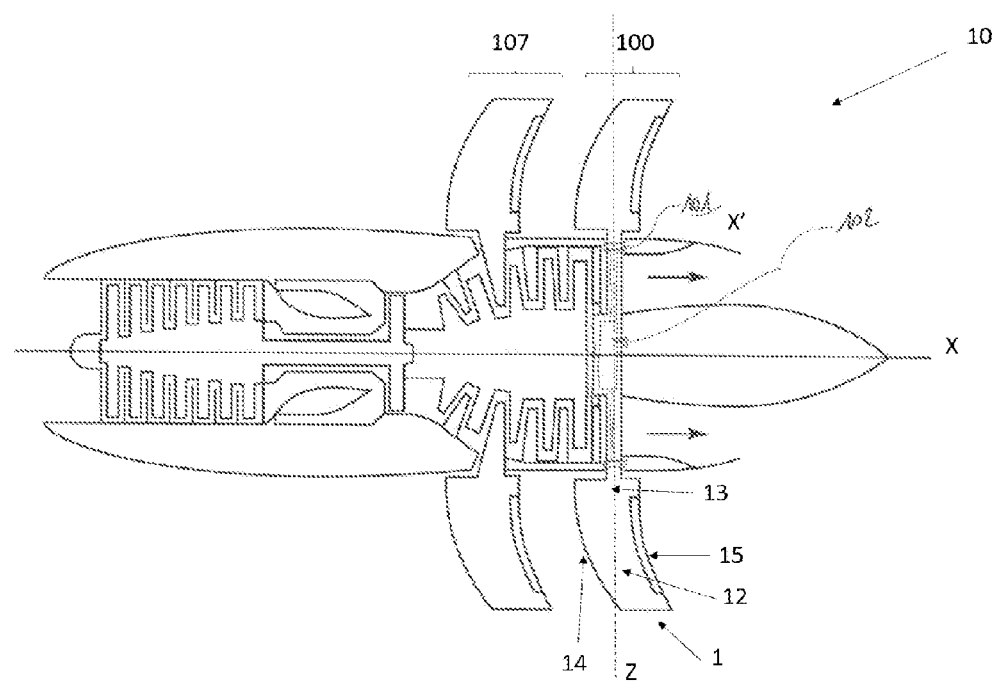
FIG. 7 is a schematic representation of a turbomachine according to the invention.

According to another aspect, the invention relates to a turbomachine, as represented in FIG. 7, comprising a fan comprising an upstream rotor stage and a downstream pitch-variable stator stage, relative to a flowing direction of the gases, the variable-pitch stator stage comprising at least one blade 1 according to the invention.

According to a last aspect, the invention relates to an aircraft comprising at least one turbomachine comprising one or several blades according to the invention.

The invention claimed is:

1. A fan blade of a turbomachine,
   the fan blade comprising a composite material structure comprising:
   a fibrous reinforcement comprising a three-dimensional weaving of strands, and
   a matrix in which the fibrous reinforcement is embedded,
   the fan blade comprising:
   a first stiffening insert extending along a first direction and emerging from the blade to be connected to a disk of a turbomachine element, and
   at least a second insert connected to the first stiffening insert along a second direction not collinear with the first direction,
   the fibrous reinforcement having a radial unbinding, the radial unbinding starting from a base of the blade and stopping at approximately 60% of a height of the blade, and the radial unbinding having a length between 20% and 30% of the length of a chord at a vane root of the blade.

2. The fan blade according to claim 1 wherein the first stiffening insert extends along a radial direction of the blade.

3. The fan blade according to claim 2, wherein the first stiffening insert is assembled to the second insert to form a cross.

4. The fan blade according to claim 3, wherein the first stiffening insert has a through-hole configured to be traversed by the second insert.

5. The fan blade according to claim 1, wherein the second insert extends along an axial direction of the blade.

6. The fan blade according to claim 1, wherein the fibrous reinforcement has an axial unbinding located between 20% and 60% of the height of the blade from the base of the blade, and emerging on a leading edge or a trailing edge of the blade.

7. A turbomachine comprising the blade according to claim 1.

8. An aircraft comprising at least one turbomachine according to claim 7.

9. A turbomachine comprising an upstream rotor stage and a downstream variable-pitch stator stage, relative to a flowing direction of the gases, the variable-pitch stator stage comprising at least one blade according to claim 1.

10. A method for manufacturing a fan blade of a turbomachine, the method comprising the steps of:
    providing a fibrous reinforcement comprising a three-dimensional weaving of strands,
    positioning and assembling in the fibrous reinforcement a first stiffening insert and at least a second insert so that the first stiffening insert extends along a first direction,
    connecting the second insert to the first stiffening insert along a second direction not collinear with the first direction, and
    injecting resin on the fibrous reinforcement,
    the method being performed so that the first stiffening insert emerges from the blade to be connected to a disk of a turbomachine element and the fibrous reinforcement has a radial unbinding, the radial unbinding starting from a base of the blade and stopping at approximately 60% of a height of the blade and the radial unbinding having a length between 20% and 30% of the length of a chord at a vane root of the blade.

11. The method according to claim 10,
    the method being performed so that the fibrous reinforcement has an axial unbinding located between 20% and 60% of the height of the blade from the base of the blade and emerging on a leading edge or a trailing edge of the blade and
    wherein the positioning of the inserts is achieved by the unbindings.

12. A fan blade of a turbomachine,
    the fan blade comprising a composite material structure comprising:
    a fibrous reinforcement comprising a three-dimensional weaving of strands, and
    a matrix in which the fibrous reinforcement is embedded,
    the fan blade comprising:
    a first stiffening insert extending along a first direction and emerging from the blade to be connected to a disk of a turbomachine element, and
    at least a second insert connected to the first stiffening insert along a second direction not collinear with the first direction,
    the fibrous reinforcement having a radial unbinding from a base of the blade and up to approximately 60% of a height of the blade and between 20% and 30% of a chord at a vane root of the blade, and the fibrous reinforcement having an axial unbinding located between 20% and 60% of the height of the blade from the base of the blade, and emerging on a leading edge or a trailing edge of the blade.

* * * * *